(12) United States Patent
Hauptmann

(10) Patent No.: US 9,676,038 B2
(45) Date of Patent: Jun. 13, 2017

(54) CHUCK

(75) Inventor: Udo Hauptmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 1126 days.

(21) Appl. No.: 13/357,708

(22) Filed: Jan. 25, 2012

(65) Prior Publication Data

US 2012/0223491 A1    Sep. 6, 2012

(30) Foreign Application Priority Data

Mar. 2, 2011 (DE) .................. 10 2011 004 985

(51) Int. Cl.

| B23B 31/16 | (2006.01) |
|---|---|
| B23B 31/107 | (2006.01) |
| B25D 17/08 | (2006.01) |
| B25D 17/24 | (2006.01) |
| B25D 11/00 | (2006.01) |

(52) U.S. Cl.

CPC ........ *B23B 31/1071* (2013.01); *B25D 11/005* (2013.01); *B25D 17/088* (2013.01); *B25D 17/24* (2013.01); *B25D 2217/0019* (2013.01); *B25D 2217/0053* (2013.01); *B25D 2250/131* (2013.01); *Y10T 279/17094* (2015.01)

(58) Field of Classification Search

CPC .......... B25D 17/088; B25D 2217/0042; B25D 11/005; B25D 17/24; B25D 2250/131; B25D 2217/0053; B25D 2217/0019; B23B 31/1071

USPC .. 279/19.6, 19.7, 19, 82, 74, 75, 22, 30, 76, 279/905, 904

See application file for complete search history.

(56) References Cited

U.S. PATENT DOCUMENTS

| 1,781,442 | A | * | 11/1930 | Currier | ............................ 279/75 |
| 2,926,020 | A | * | 2/1960 | Dayton et al. | ................... 279/75 |
| 2,982,556 | A | * | 5/1961 | Peck | ................................ 279/19 |
| 3,103,367 | A | * | 9/1963 | Peck | ................................ 279/76 |
| 3,405,950 | A |   | 10/1968 | Cox |  |
| 6,179,300 | B1 | * | 1/2001 | Baumann et al. | ............ 279/19.4 |
| 6,561,523 | B1 | * | 5/2003 | Wienhold | ....................... 279/30 |
| 8,459,658 | B2 | * | 6/2013 | Cycon | .......................... 279/19.6 |
| 2002/0125652 | A1 |   | 9/2002 | Hanke |  |
| 2006/0192350 | A1 |   | 8/2006 | Kleine et al. |  |
| 2007/0024013 | A1 | * | 2/2007 | Hauptmann et al. | ............ 279/75 |
| 2007/0120331 | A1 | * | 5/2007 | Manschitz et al. | ............. 279/19 |
| 2007/0131076 | A1 |   | 6/2007 | Yasheng |  |

FOREIGN PATENT DOCUMENTS

| DE | 16 02 717 | 6/1970 |
| DE | 34 21 287 | 12/1984 |
| DE | 101 05 406 A1 | 8/2002 |
| EP | 1 238 760 A1 | 9/2002 |

(Continued)

*Primary Examiner* — Sunil K Singh
*Assistant Examiner* — Paul M Janeski
(74) *Attorney, Agent, or Firm* — Davidson, Davidson & Kappel, LLC

(57) ABSTRACT

A chuck for a chiseling power tool has a holding sleeve that is arranged concentrically with respect to a working axis and that serves to receive one shank end of a tool having a locking groove. A locking element protrudes partially into the holding sleeve so as to engage with the locking groove. A sliding block guides the locking element, whereby the sliding block has a section that is wound helically around the working axis.

14 Claims, 8 Drawing Sheets

(56) References Cited

FOREIGN PATENT DOCUMENTS

| | | |
|---|---|---|
| EP | 1 695 797 | 8/2006 |
| GB | 2141659 | 1/1985 |
| JP | 2004 106136 A | 4/2004 |

\* cited by examiner

CHUCK

This claims the benefit of German Patent Application DE 10 2011 004 985.1, filed Mar. 2, 2011 and hereby incorporated by reference herein.

The present invention relates to a chuck, especially for a chiseling, drilling and/or boring power tool.

SUMMARY OF THE INVENTION

A hammer drill or another chiseling power tool is supposed to halt its operation automatically as soon as a user lifts the hammer drill, together with the chiseling tool, off a substrate or off the workpiece. This diminishes the stress to which the user and the hammer drill are subjected. The switch-off procedure is triggered when the tool is extended out of a chuck to the maximum extent, as is typically the case when the hammer drill is lifted off. However, due to the last impact that had been received, the tool can ricochet off a stop and can retract back into the chuck. Damping this so-called empty strike can prevent such a recoil, thus facilitating the automatic switch-off.

It is an object of the present invention to provide a chuck for a chiseling power tool has a holding sleeve that is arranged concentrically with respect to a working axis and that serves to hold one shank end of a tool having one or more locking grooves. A locking element of the chuck protrudes partially into the holding sleeve so as to engage with the locking groove. The locking element can be moved along the working axis. A sliding block is coupled to the locking element in such a way that the sliding block guides the locking element directly or indirectly. The sliding block has a section that is wound helically around the working axis or that is skewed with respect to the working axis. The translatory movement of the tool during an empty strike causes the locking element to be carried along the working axis. The sliding block forces at least one component of the power tool to rotate relative to the tool, as a result of which at least some of the impact energy is converted into rotational energy. The chirality of the sliding block prevents recovery of the rotational energy for a return movement of the tool back into the power tool. The power tool preferably remains extended. The axially movable locking elements can themselves be forced by the sliding block to rotate and/or can cause the sliding block to rotate if the sliding block is mounted so as to rotate around the working axis with respect to the locking element. Moreover, instead of rotating the component around the working axis, the sliding block can move the component translatorially perpendicular to the working axis.

One embodiment provides for the inside of the locking sleeve radially facing the working axis to touch the at least one locking element, and for the sliding block to be formed on the inside of the locking sleeve. The locking sleeve has a large inertia that allows a large portion of the impact energy to be converted into rotational energy. The locking sleeve can be mounted so as to rotate around the working axis.

One embodiment provides for the inside of the locking sleeve to have a cutout into which another locking element protrudes, whereby the dimension of the cutout is greater in the circumferential direction than the dimension of the sliding block in the circumferential direction. The cutout can have flanks that are parallel to the working axis, and the sliding block can have flanks that are skewed with respect to the working axis or that are wound around the working axis. In the case of a chuck having more than one locking element for locking the tool, it can be advantageous if only one of the locking elements is positively guided in a helical or skewed sliding block. One locking element or the other locking element can be moved into one or more of the cutouts along the working axis in the locking sleeve without being influenced by the sliding block or by a rotational movement of the sliding block.

One embodiment has a detachable sliding block lock which, in a locking position, tensions the sliding block with a spring acting in the impact direction and, in an unlocked position, disengages the spring from the sliding block. The locking sleeve can be moved along the working axis, as a result of which frictional forces that counteract a rotation can be reduced. Moreover, the rotational movement of the locking sleeve is reduced since it can move axially to and synchronously with the locking elements. The sliding block lock can have the spring and a coupling element. The coupling element, which is tensioned by the force of the spring, rests against the locking sleeve as seen in the direction of impact. An actuation sleeve of the chuck, which can be activated by the user, can be moved relative to the locking sleeve opposite to the direction of impact. The actuation sleeve can also be joined to the coupling element, for example, it is made of a single piece or else it is joined with a positive fit. Alternatively or additionally, the actuation sleeve can rest on the coupling element directly or indirectly via a rigid connection opposite to the direction of impact.

BRIEF DESCRIPTION OF THE DRAWINGS

The description below explains the invention on the basis of embodiments provided by way of example and on the basis of figures. These figures show the following.

DETAILED DESCRIPTION

Figure 1:
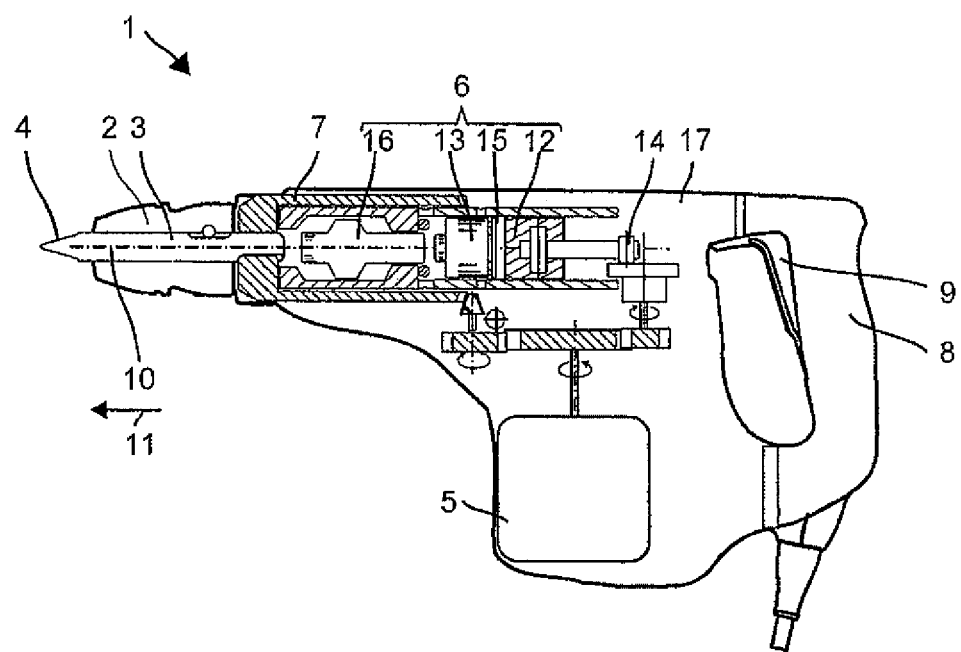
FIG. 1: a power tool.

Unless otherwise indicated, identical elements or elements having the same function are designated in the figures with the same reference numerals. Unless otherwise explicitly indicated, radial and axial directions refer to the working axis of the power tool. Orientations are given without additional remarks pertaining to the direction of impact of the power tool, according to which a rear element is offset with respect to a front element as seen in the direction of impact. The length refers to the dimension along a (lengthwise) direction of the greatest extension of an element, while the width is the largest dimension in the plane perpendicular to the lengthwise direction.

FIG. 1 schematically shows a hammer drill 1 as an example of a chiseling power tool. The hammer drill has a chuck 2 into which a shank end 3 of a tool, for instance, of a boring tool 4, can be inserted. A motor 5 that drives a striking mechanism 6 and a driven shaft 7 forms a primary drive of the hammer drill 1. A user can handle the hammer drill 1 by means of a grip 8 and can operate the hammer drill 1 by means of a system switch 9. During operation, the hammer drill 1 continuously turns the boring tool 4 around a working axis 10, a process in which it can drive the boring tool 4 into a substrate in the impact direction 11 along the working axis 10.

The striking mechanism 6 is, for example, a pneumatic striking mechanism 6. An exciter 12 and a striker 13 are configured so as to move in the striking mechanism 6 along the working axis 10. The exciter 12 is coupled to the motor 5 by means of a cam 14 or a tumbler, and it is forced to execute a periodical, linear movement. An air spring formed by a pneumatic chamber 15 between the exciter 12 and the striker 13 couples a movement of the striker 13 to the movement of the exciter 12. The striker 13 can strike a rear end of the boring tool 4 directly or else it can transfer part of its pulse to the boring tool 4 indirectly via an essentially static intermediate striker 16. The striking mechanism 6 and preferably the additional drive components are arranged inside a power tool housing 17.

Figure 2:
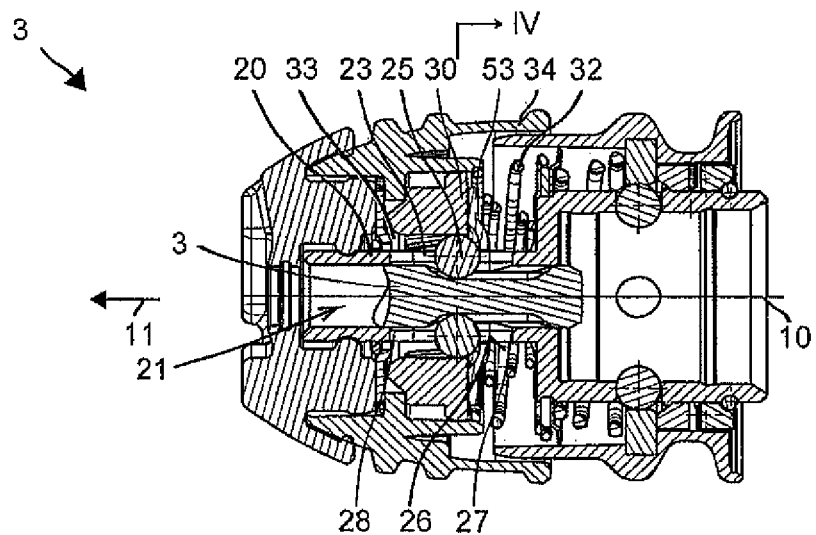
FIGS. 2, 3 and 4: a chuck.
Figure 3:
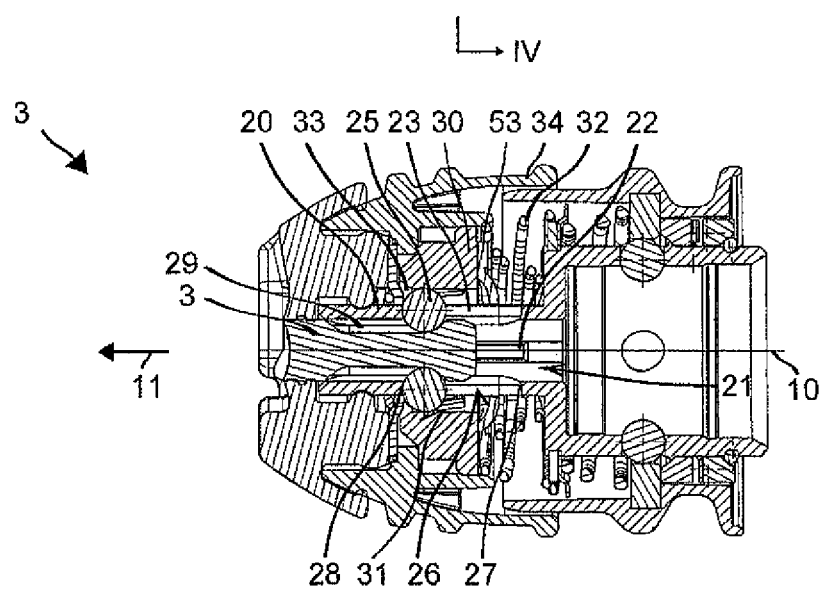
Figure 4:
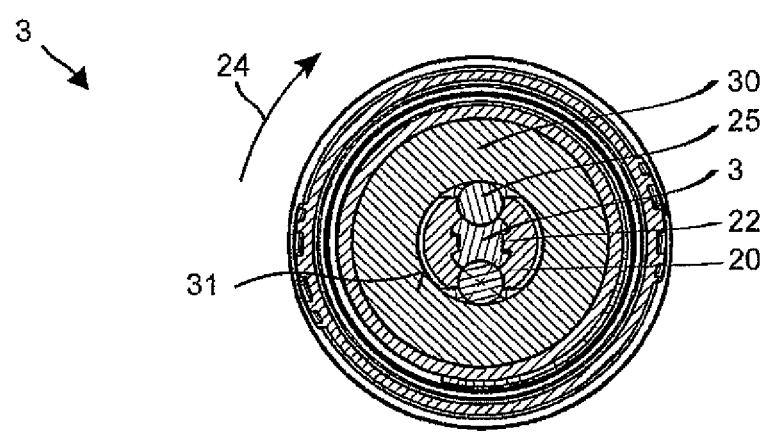

FIG. 2 and FIG. 3 show details of the chuck 2 having, for instance, an inserted shank 3 that is depicted in FIG. 2 in a basic position for boring operation, in other words, it is in contact with the intermediate striker 16, and that is depicted in FIG. 3 in a position during an empty strike. FIG. 4 shows a cross-sectional view along the plane IV-IV. The chuck 2 has a holding sleeve 20 that is arranged concentrically to the working axis 10. The inner diameter of a cylindrical or prismatic cavity 21 of the holding sleeve 20 has only a slight amount of play and is almost the same as the outer diameter of the shank end 3, which is largely standardized. The shank end 3 fits in the holding sleeve 20 along the working axis 10. The chuck 2 shown has webs 22 to rotate and carry along the shank end 3. The webs 22 are rigidly joined to the holding sleeve 20 and they protrude into the cavity 21. Suitable tools, for instance, boring tools, have open longitudinal grooves on their shank ends, and the webs 22 engage with these longitudinal grooves. Consequently, the shank end 3 is blocked against executing a rotation relative to the holding sleeve 20, so that a torque exerted by the drive onto the holding sleeve 20 is transferred to the tool 4.

Two slots 23 pass through the holding sleeve 20 and they open the cavity 21 in the radial direction, that is to say, perpendicular to the working axis 10. The dimension of the slots 23 along the working axis 10 is typically smaller than the dimension of the slots 23 in the circumferential direction 24 around the working axis 10. Locking elements 25 are inserted into the slots 23 and they can be moved along the working axis 10. The lengthwise sides 26 of the slots 23 guide the locking elements 25 in the slots 23 along the working axis 10 between a front end 27 and a rear end 28. Examples of locking elements 25 are rolling balls, rollers, latches or sliding pins. The radial dimension of the slots 23 is smaller than the radial dimension of the locking elements 25. The locking elements 25 protrude beyond the holding sleeve 20 towards the outside, that is to say, away from the working axis 10, as well as towards the inside into the cavity 21 of the holding sleeve 20.

Along the working axis 10, the shank end 3 has one or more locking grooves 29 that are closed on both sides and into which the locking elements 25 engage. A longitudinal groove is provided as the locking grove 29 on the shank end 3 shown. In the basic position, the tool 4 is retracted into the chuck 2 to the maximum extent, whereby the locking elements 25 can rest against the front end 27 of the slots 23. In the case of an empty strike of the tool 4, the tool 4 can move along the working axis 10 in the chuck 2 by a first distance, without carrying along the locking elements 25, and subsequently by a second distance, whereby then the locking elements 25 are slid along the slots 23 until the locking elements 25 come into contact with the rear end 28. Alternative types of shank ends can have, for example, a circular groove or an annular groove, in which case the locking elements 25 are always moved when the tool 4 executes an axial movement.

A locking sleeve 30 is pulled over the holding sleeve 20 and the locking elements 25. The inside 31 of the locking sleeve 30 facing radially towards the inside is in contact with the locking elements 25, as a result of which the latter are prevented from extending out of the cavity 21. Therefore, once a tool 4 has been inserted, it is locked by means of the locking elements 25 and the locking sleeve 30. The locking sleeve 30 can be moved axially against the restoring force of one or more springs 32, as a result of which a free space 33 is made available, which is adjacent to the locking elements 25 in the radial direction and into which the locking elements 25 can deflect in order to extend out of the cavity 21. A user can move the locking sleeve 30 indirectly via an actuation sleeve 34 that is freely accessible from the outside. The locking sleeve 30 is mounted so as to rotate around the working axis 10. In particular, the locking sleeve 30 can rotate around the holding sleeve 20. Preferably, the locking sleeve 30 can rotate freely in the actuation sleeve 34 without carrying it along.

Figure 5:
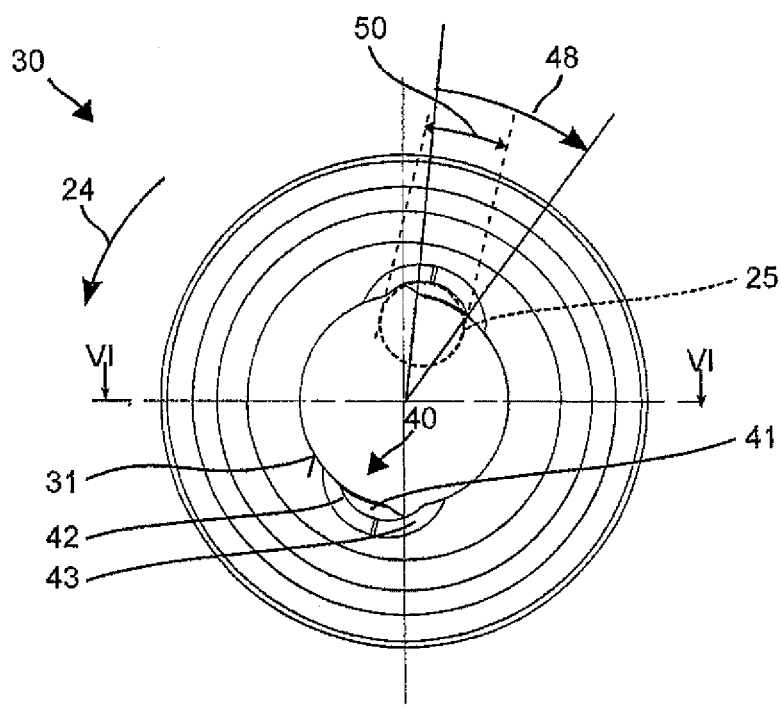
FIGS. 5, 6: a locking sleeve of the chuck.
Figure 6:
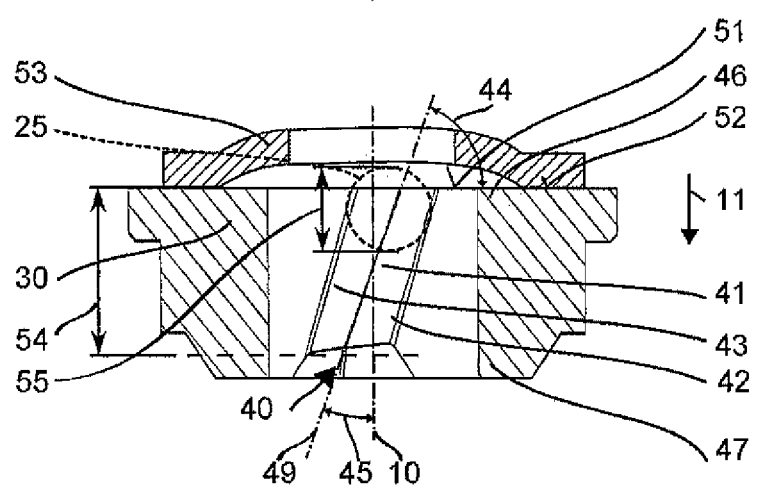

FIGS. 5 and 6 show the locking sleeve 30 in a top view opposite to the direction of impact 11 and in a cross-sectional view in the plane VI-VI. The inside 31 is provided with a helical sliding block 40 with which the locking elements 25 engage. The sliding block 40, for example, has a groove 41 that has a leading flank 42 and a trailing flank 43 in the circumferential direction 24. The two flanks 42, 43 can be bowl-shaped, for instance, with a circular-segmented cross section perpendicular to the working axis 10. The shape of the groove 41, or the groove wall, matches the locking element 25, in other words, the contour of the groove 41 in a sectional plane perpendicular to the working axis 10 is congruent with the contour of the part of the locking element 25 that engages with the groove 41. In the case of spherical locking elements 25, the contour of the groove 41 is preferably a circular segment. The locking element 25 engages with the groove 41 and it is prevented from executing a movement in a plane perpendicular to the working axis 10, both clockwise and counterclockwise.

The sliding block 40 or the groove 41 is wound helically around the working axis 10. The thread angle 44 of the sliding block 40, that is to say, the inclination of the sliding block 40 vis-à-vis a plane perpendicular to the working axis 10 is preferably between 65° and 85°, for example, between 75° and 82°. Correspondingly, the gradient angle 45 of the groove 41 vis-à-vis the working axis 10, determined along a cylindrical surface around the working axis 10, is preferably in the range between 5° and 25°, for instance, between 8° and 15°. The sliding block 40 is preferably wound only around a fraction of a full revolution, for example, between 1/20 and 1/10 of a revolution, around the working axis 10. A front end 46 of the sliding block 40 as seen in the direction of impact 11 is arranged so as to be rotated around the working axis 10 by an angle 48 between 5° and 25° with respect to a rear end 47 of the sliding block 40 as seen in the direction of impact 11, preferably counterclockwise as seen in the direction of impact 11. The sliding block 40 runs over its entire extension along the working axis 10 in the same rotational direction around the working axis 10; a change of the rotational direction along the working axis 10 is not provided for. The groove 41 can also be oriented to be approximately straight and parallel to a longitudinal axis 49. The longitudinal axis 49 is skewed relative to the working axis 10, that is to say, the longitudinal axis 49 of the groove 41 is neither parallel to the working axis 10 nor does it intersect the working axis 10.

Contours of the groove 41, which are perpendicular to the working axis, are preferably congruent, even when they are arranged in various angular positions with respect to the working axis 10. The locking element 25 is continuously and positively guided along the groove 41. In the case of a movement along the groove 41, the locking element preferably continuously touches the leading flank 42 and the trailing flank 43, which are at a constant distance 50. Owing to the helical or skewed flanks 42 or groove 41, the sliding block 40 forces a locking element 25 that is moving along the working axis 10 to execute a rotational movement around the working axis 10 relative to the locking sleeve 30.

In the embodiment shown, the sliding block 40 starts at a front edge 51 of the inside 31 or at a front face 52 of the locking sleeve 30. In its basic position (FIG. 2), the locking element 25 is typically close to the front edge 51 and thus engaged with the sliding block 40. A spring-loaded washer 53 on the front face 52 prevents the locking element 25 from coming out of the locking sleeve 30 and thus out of the engagement with the sliding block 40 opposite to the direction of impact 11. In the radial direction, the washer 53 overlaps with the locking elements 25. Due to the engagement in the basic position, the locking sleeve 30 rotates along with the holding sleeve 20 during the drilling or boring operation of the handheld power tool.

An extension 54 of the sliding block 40 along the working axis 10 is at least 50% longer than the extension 55 of the locking element 25 along the working axis 10, or else it is longer by at least 0.5 cm. The length 54 of the sliding block 40 is preferably between 0.5 cm and 2 cm. The sliding block 40 can extend over the entire length of the locking sleeve 30.

During an empty strike of the tool 4, the tool 4 moves out of the chuck 2 along the working axis 10 to such an extent that the locking elements 25 strike against the rear end 28 of the slot 23 (FIG. 3). In this process, the locking elements 25 move along the working axis 10 in the direction of impact 11, for instance, from the machine side or the front end 27 of the slots 23 to a tool side or the rear end 28 of the slots 23. Following the axial movement of the locking element 25, the locking sleeve 30 is forced by the sliding block 40 to execute a rotation around the working axis 10. At least some of the kinetic energy of the tool 4 is converted into rotational energy of the locking sleeve 30. The locking sleeve 30 is rotationally accelerated in a first rotational direction, which is prescribed by the sliding block 40. The first direction of rotation is, for example, counterclockwise as seen in the direction of impact 11, identical to the usual rotational direction of a drill or bore 4.

Typically, the tool 4 strikes against a rear stop formed, for instance, by the rear end 28 of the slots 23, and moves back opposite to the impact direction 11. The return movement is not assisted by the rotating locking sleeve 30; on the contrary, the rotating locking sleeve 30 brakes the tool 4. The reason for this is the handedness or chirality of the sliding block 40, which is forced to rotate in a second rotational direction opposite to the first rotational direction during the return movement of the locking element 25. The tool 4 loses kinetic energy quickly and preferably comes to a halt near the rear stop. The rotational energy of the locking sleeve 30 can be dissipated through friction, for instance, on the actuation sleeve 34, or through a counter-torque generated by the user.

The locking sleeve 30 preferably cannot be moved along the working axis 10 by the forces exerted by the tool 4. The locking sleeve 30 shown is in contact with a stop in the direction of impact 11. The springs 32 exert a force in the direction of impact 11 that is greater than the axial fractions of the forces transmitted by the locking elements 25 onto the sliding block 40.

Figure 7:
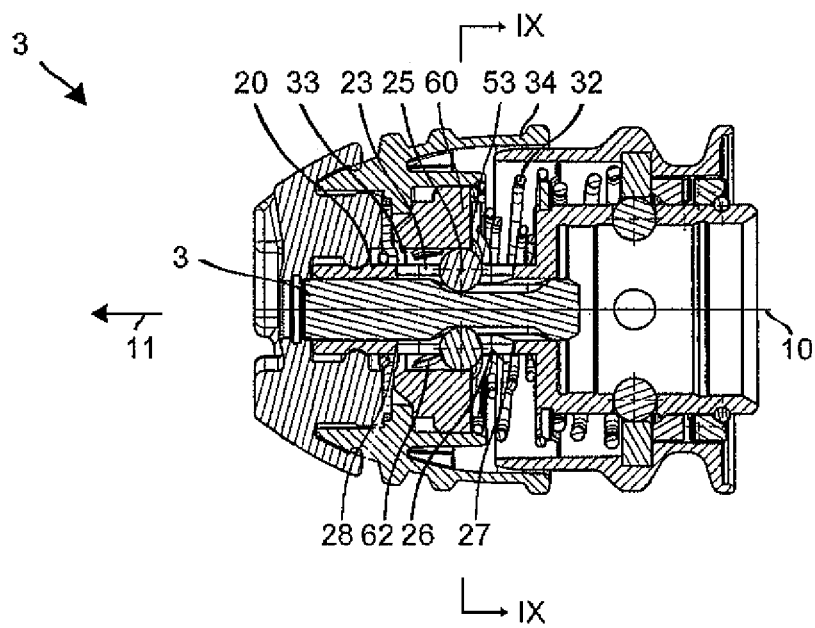
FIGS. 7, 8 and 9: a chuck.
Figure 8:
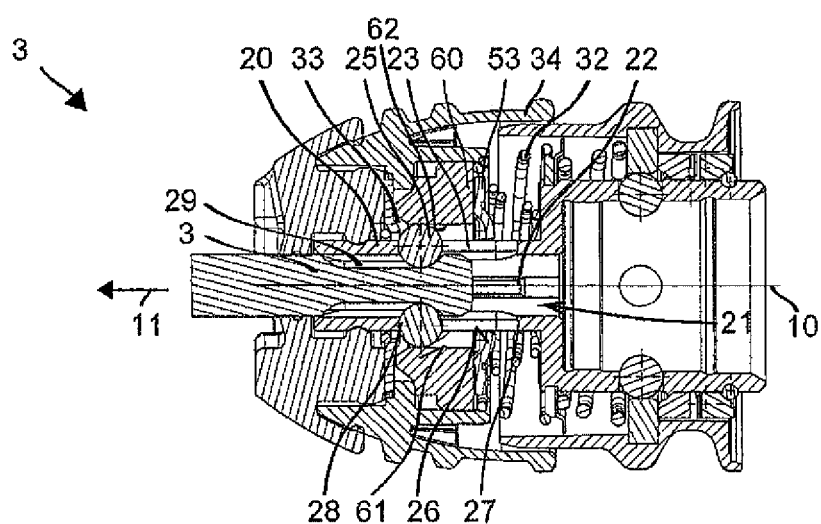
Figure 9:
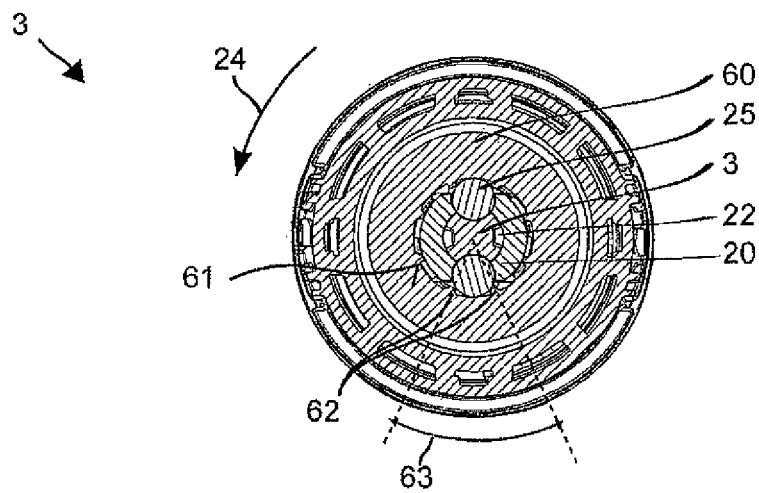
Figure 10:
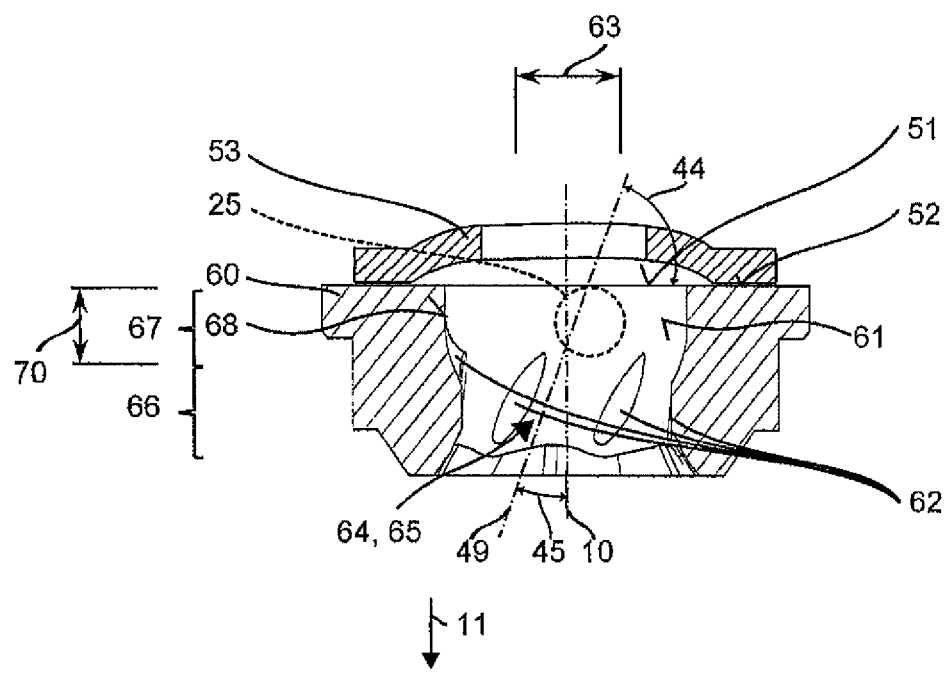
FIG. 10: a locking sleeve of the chuck.

FIG. 7 and FIG. 8 show an embodiment of the chuck 2 in the basic position and during an empty strike. FIG. 9 shows a cross-sectional view in the plane IX-IX. FIG. 10 shows a section along the working axis 10 through a locking sleeve 60 of the chuck 2.

On its inside 61 facing the working axis 10, the locking sleeve 60 has several ribs 62 that project radially towards the working axis 10, for example, between six and ten ribs 62. The ribs 62 are preferably distributed uniformly along the circumferential direction 24 and arranged at the same angular distances 63. Each pair of adjacent ribs 62 delimit a groove-like depression 64 that, as a sliding block 65, can guide the locking elements 25. The angular distance 63 is selected in such a manner that the locking element 25 preferably simultaneously touches one of the ribs 62 that precedes it in the circumferential direction 24 and one of the ribs 62 that follows it in the circumferential direction 24. The locking element 25 engages with one of the sliding blocks 65, and is thus prevented from executing a movement in a plane perpendicular to the working axis 10. The ribs 62 are skewed with respect to the working axis 10 or wound helically around the working axis 10. The inclination 45 relative to the working axis 10 is in the range between 5° and 25°, for instance, between 8° and 15°.

The inclination 45 can increase in the direction of impact 11. In particular, a front section of the sliding block 65 can have a gradient between 1° and 5°, while a rear section is inclined by a value between 8° and 15°.

The ribs 62 extend along the working axis 10 only over a first section 66 of the inside 61. Adjacent to the ribs 62 or the sliding blocks 65 opposite to the direction of impact 11, there is a second section 67 with a smooth, cylindrical inner surface 68 that is coaxial to the working axis 10. The cylindrical inner surface 68 can be in contact with the locking element 25. An axial extension 69 of the cylindrical inner surface 68 is preferably approximately the same as or else up to 50% greater than an extension 70 of the locking element 25 along the working axis 10. The locking sleeve 60 can turn freely around the working axis 10 when the entire locking element 25 overlaps with the cylindrical inner surface 68 along the working axis 10.

Figure 11:
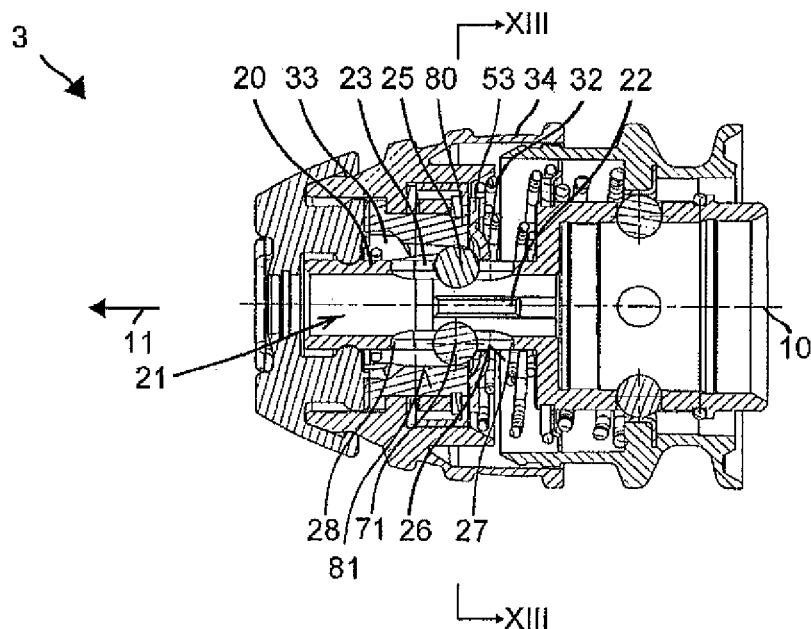
FIGS. 11 and 12: a chuck.
Figure 12:
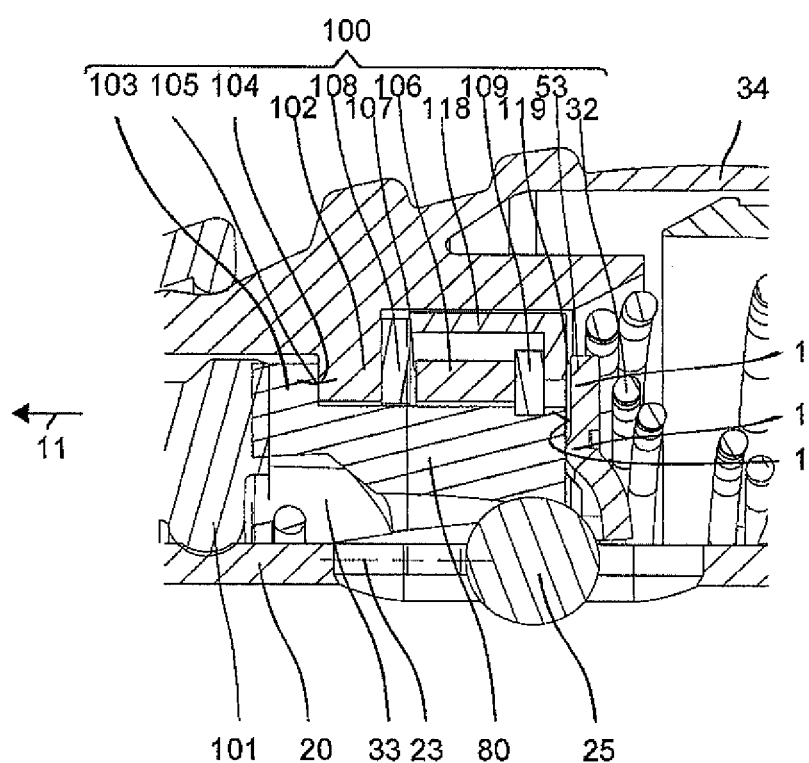

FIG. 11 shows an embodiment of the chuck 3 in a longitudinal section; FIG. 12 shows a partial section of FIG. 11 in an enlarged view. The chuck 3 contains a holding sleeve 20 that has two slots 23 that are preferably symmetrical to the working axis 10. A locking element 25, 71 is inserted into each of the slots 23, said locking element 25, 71 extending radially inwards and radially outwards beyond the holding sleeve 20. The locking sleeve 80 has an inside 81 that is oriented towards the working axis 10 and that touches the locking element 25.

Figure 13:
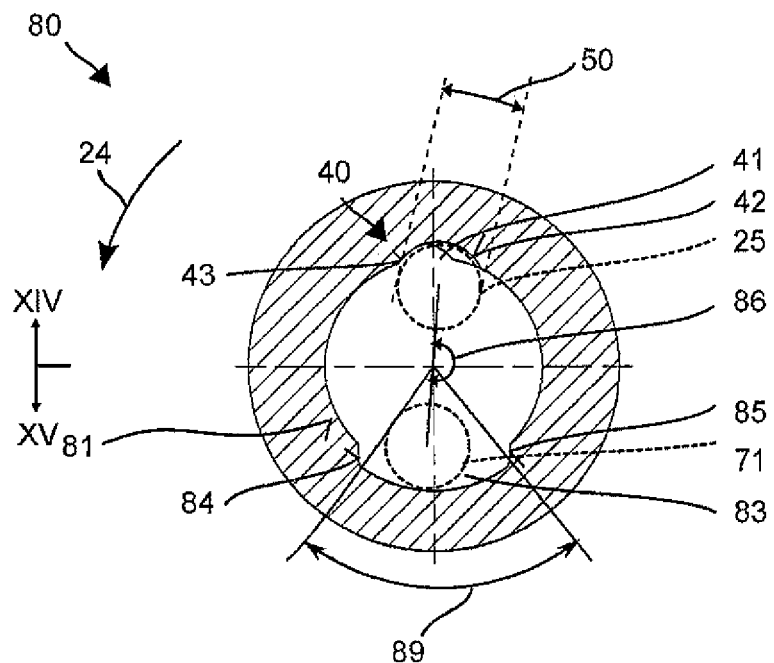
FIGS. 13, 14 and 15: a locking sleeve of the chuck.
Figure 14:
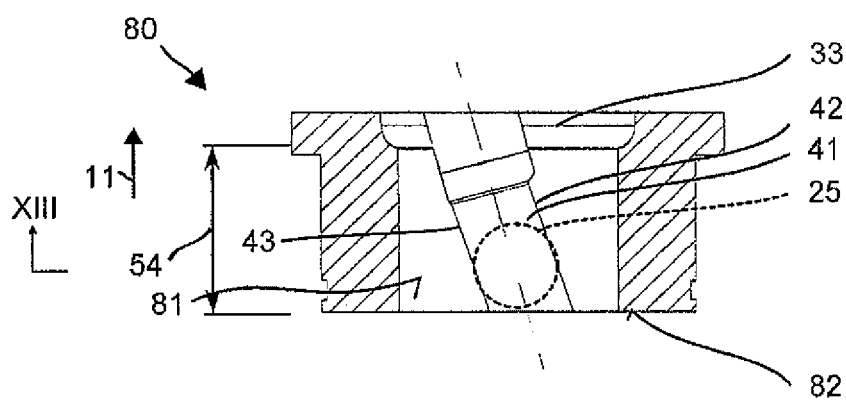
Figure 15:
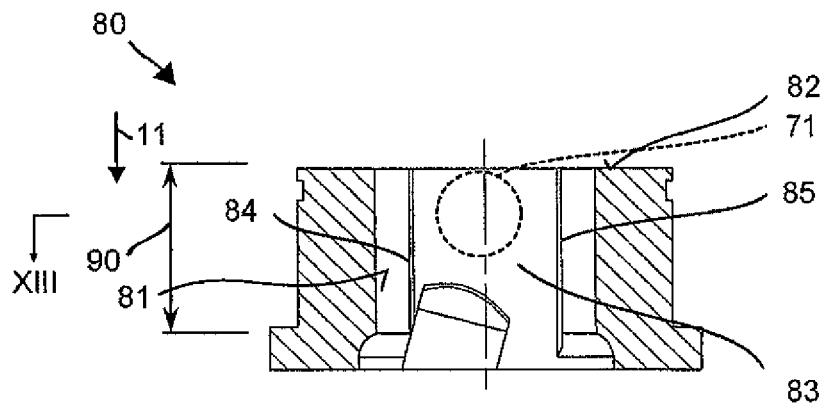
Figure 16:
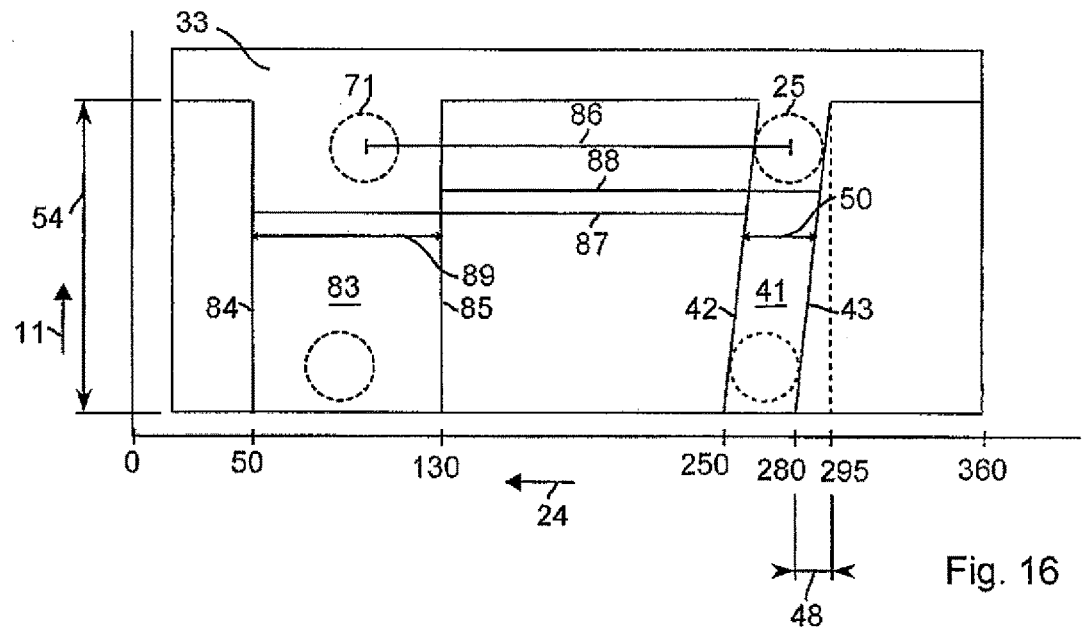
FIG. 16: an unrolled depiction of the locking sleeve.

FIG. 13 shows the locking sleeve 80 in a cross-sectional view along the plane XIII-XIII, while FIG. 14 and FIG. 15 show the locking sleeve 80 in a longitudinal section in the same planes XIV-XIV, XV-XV in the opposite viewing direction. FIG. 16 schematically shows an unrolled view of the inside 81 opposite to the circumferential direction 24. The figures on the abscissa indicate examples of angular positions in degrees, relative to a randomly selected zero point.

On the inside 81, there is a skewed or helical sliding block 40 with which the first of the locking elements 25 engages.

The sliding block 40 can be configured, for instance, as described above in conjunction with FIG. 5 and FIG. 6. The sliding block 40 can have, for example, a skewed or helical groove 41 on the inside 81. A leading flank 42 of the groove 41 in the circumferential direction 24 and a trailing flank 43 of the groove 41 in the circumferential direction 24 are skewed or helical. The distance 50 of the two flanks 42, 43 preferably remains constant along the working axis 10. The distance 50 is selected in such a way that the locking element 25 is guided so as to be enclosed between the two flanks 42, 43, that is to say, it touches the leading flank 42 as well as the trailing flank 43.

The groove 41 has a shape that is adapted to the locking element 25 in such a way that, in the plane perpendicular to the working axis 10, the locking element 25 is enclosed by the groove 41 in the circumferential direction 24 as well as opposite to the circumferential direction 24. In a cross section perpendicular to the working axis 10, the groove 41 can have, for instance, the shape of the circular segment having a radius that corresponds to the radius of the spherical locking element 25. In a preferred embodiment, the groove 41 begins at a front end 82 of the locking sleeve 80. An extension 54 of the groove 41 along the working axis 10 is at least 50% greater than an extension of the locking element 25 along the working axis 10.

The locking sleeve 80 is in contact with the second locking element 71 in the radial direction in order to prevent it from extending out of the cavity 21. In contrast to the first locking element 25, the second locking element 71 is not enclosed in the circumferential direction 24 by the locking sleeve 80. A rotation of the locking sleeve 80 around the working axis 10 relative to the second locking element 71 is possible.

The embodiment of the locking sleeve 80 given by way of an example has a wide cutout 83 on the inside 81. A leading flank 84 in the circumferential direction 24 and a trailing flank 85 in the circumferential direction 24 can be situated parallel to the working axis 10. The angular arrangement of the cutout 83 with respect to the groove 41 is selected so as to correspond to the angular arrangement of the locking elements 25, 71, that is to say, their slots 23. In the example, the locking elements 25, 71 are arranged opposite from each other, by a first angle 86, which equals 180°. The cutout 83 is arranged opposite from the groove 41, that is to say, rotated vis-à-vis the groove 41 around the working axis 10.

As described above, the locking sleeve 80 rotates when the first locking element 25 is moved along the working axis 10. The wide cutout 83 is configured in such a manner that its flanks 84, 85 do not touch the second locking element 71 in any of the rotational positions that are assumed. The leading flank 84 of the cutout 83 is at a distance by at least the second angle 87, which is preferably 10° greater than the first angle 86. In the example shown in FIG. 16, the distance is 200°. The trailing flank 85 of the cutout 83 is at a distance from the trailing flank 43 of the groove 41 by at the maximum a third angle 88 that is preferably 10° smaller than the first angle 86, namely 165° in the example.

The extension 89 of the cutout 83 in the circumferential direction 24 is greater than the sum of the angle 48 by which the groove 41 is wound around the working axis 10 and the extension 50 of the groove 41 in the circumferential direction 24. The cutout 83 is wider than a projection of the groove 41 onto a plane perpendicular to the working axis 10, preferably by at least 20°.

An extension 90 of the cutout 83 along the working axis 10 is preferably the same as the extension 54 of the sliding block 40 along the working axis 10. During a shared rectilinear movement of the first locking element 25 and of the second locking element 25 along the working axis 10 triggered by an empty strike, the first locking element 25 forces the locking sleeve 80 to rotate, while the second locking element 25 does not exert any force onto the locking sleeve 80 in the circumferential direction 24 or opposite to the circumferential direction 24. The cutout 83 has sufficient play in the circumferential direction 24, so that its edges or flanks 84, 85 remain at a distance from the second locking element 25 in the rotating locking sleeve 80.

During an empty strike, the sliding block 40 should be accelerated in a rotational direction by the locking element 25 that moves along the working axis 10 for purposes of dissipating kinetic energy. When a tool 4 is inserted or removed, the locking element 25 is likewise moved along the working axis 10, although, if at all possible, without the effort involved in causing the locking sleeve 80 to rotate.

In the locked position, a detachable sliding block lock 100 suppresses or prevents movement of the locking sleeve 80 along the working axis 10 and, in the unlocked position, allows an axial movement of the locking sleeve 80. In the latter position, the sliding block 40 can move parallel to the locking element 25 and is not forced to execute a relative rotational movement.

The detachable sliding block lock 100 is coupled to the actuation sleeve 34. The sliding block lock 100 is unlocked when the user slides the actuation sleeve 34 opposite to the direction of impact 11 in the example shown in order to remove the tool 4. If the actuation sleeve 34 is in a position for locking the tool 4, the sliding block lock 100 is likewise in its locked position.

The sliding block lock 100 shown by way of an example has one or more springs 32 that push the locking sleeve 80 in the direction of impact 11 against a stop. A dust seal 101, for example, forms the stop. Preferably, the stop is rubber-coated in order to bring about a high level of friction of the locking sleeve 80. The spring 32 is configured in such a way that its spring force is greater than the forces that are exerted along the working axis 10 by the locking sleeve 80 during operation. The locking sleeve 80 has a fixed position along the working axis 10 whenever the user has not intervened.

The sliding block lock 100 has a rigid coupling element that is interconnected by the spring 32 in the force path between the locking sleeve 80. In the locked basic position, the coupling element transfers onto the locking sleeve 80 the force of the spring 32 acting in the direction of impact 11. In order to establish the unlocking position, the coupling element can be detached from the locking sleeve 80 in order to interrupt the force path. The coupling element is removed from the locking sleeve 80 by means of the actuation sleeve that can be moved or rotated so as to engage with the coupling element, so that the coupling element can then be taken along.

An example of a coupling element is a washer 53. The washer 53 has a side which faces opposite to the direction of impact 11 and against which the spring 32 rests. A side 115 facing in the direction of impact 11 has two areas 116, 117. In the basic position, the first area 116 is in contact with the locking sleeve 80. The force transmitted by the spring 32 onto the washer 53 is applied in the direction of impact 11 into the locking sleeve 80. A second area 117 is opposite from a carrier 118 of the actuation sleeve 34 in the direction of impact 11. The carrier 118 can be formed, for instance, by a spacer sleeve 118 that is separate from the actuation sleeve, or else by a projection joined to the actuation sleeve 34 with a positive fit or formed as a single piece. Between the washer 53 and the carrier 118, in the basic position, there is preferably a small air gap 119 in order to ensure that the force of the spring 32 is introduced into the locking sleeve 80 and not into the actuation sleeve 34. When a user moves the actuation sleeve 34 opposite to the direction of impact 11, for example, when the tool 4 is being removed, the carrier 118 moves the washer 53 opposite to the direction of impact 11. The force of the spring 32 is then applied by the washer 53 into the actuation sleeve 34, while the locking sleeve 80 is free of any forces. Any braking effect of the locking sleeve 80 is either diminished or eliminated. The actuation sleeve 34 and the locking sleeve 80 are preferably only coupled weakly, along the working axis 10, especially in comparison to the force of the spring 32.

The actuation sleeve 34 can be an alternative or additional coupling element of the sliding block lock 100. For example, an annular, radial projection 102 of the actuation sleeve 34 extends behind a radial projection 103 of the locking sleeve 80 on one side that faces the spring 32. A surface 104 of the actuation sleeve 34 facing in the direction of impact 11 is in contact with a surface 105 of the locking sleeve 80 that faces opposite to the direction of impact 11. The force of the spring 32 is transmitted to the locking sleeve 80 via the actuation sleeve 34. However, as soon as the user moves the actuation sleeve 34 opposite to the direction of impact 11, the flux of force is interrupted and the locking sleeve 80 is uncoupled from the springs 32.

The actuation sleeve 34 and the locking sleeve 80 can be coupled to each other via a soft spring 106 of the sliding block lock 100. The soft spring 106 counteracts a movement of the actuation sleeve 34 in the direction of impact 11 relative to the locking sleeve 80. The soft spring 106 is preferably a compression spring that is arranged in a force path along the working axis 10 between the actuation sleeve 34 and the locking sleeve 80. In the basic position of the chuck 2, the soft spring is preferably not tensioned.

The soft spring 106 is arranged between a stop 109 of the locking sleeve 80 facing in the direction of impact 11 and a stop 108 of the actuation sleeve 34 facing opposite to the direction of impact 11. The two stops 108, 109 are, for instance, rings that are axially unmovable with respect to the actuation sleeve 34 or the locking sleeve 80 but that can be rotated relative to the actuation sleeve 34 and the locking sleeve 80 around the working axis 10. The ring 109 can be, for example, a snap ring inserted into an annular groove in the locking sleeve 80. In the example shown, an air gap 107 can exist between the soft spring 106 and one of the stops 108, 109, as long as the actuation sleeve 34 is in the basic position. The spring constant of the soft spring 106 is preferably smaller than one-fifth of the force of the springs 32. The soft spring 32 can be a helical spring or a ring made of an elastomeric material. When the tool 4 is being changed, especially when it is being removed, the locking sleeve 80 moves along the working axis 10 and is only forced to execute a limited rotational movement. The soft spring 106 causes the locking sleeve 80 to be carried along when a user moves the actuation sleeve 34 opposite to the direction of impact 11. The free space 33 moves in the direction of the slot 23, into which the locking element 25 can radially deflect in order to release the shank 3.

The sliding block lock 100 is only described in conjunction with the locking sleeve 80 by way of an example but it can also be employed in other embodiments of the chuck 2.

Figures 17, 18:
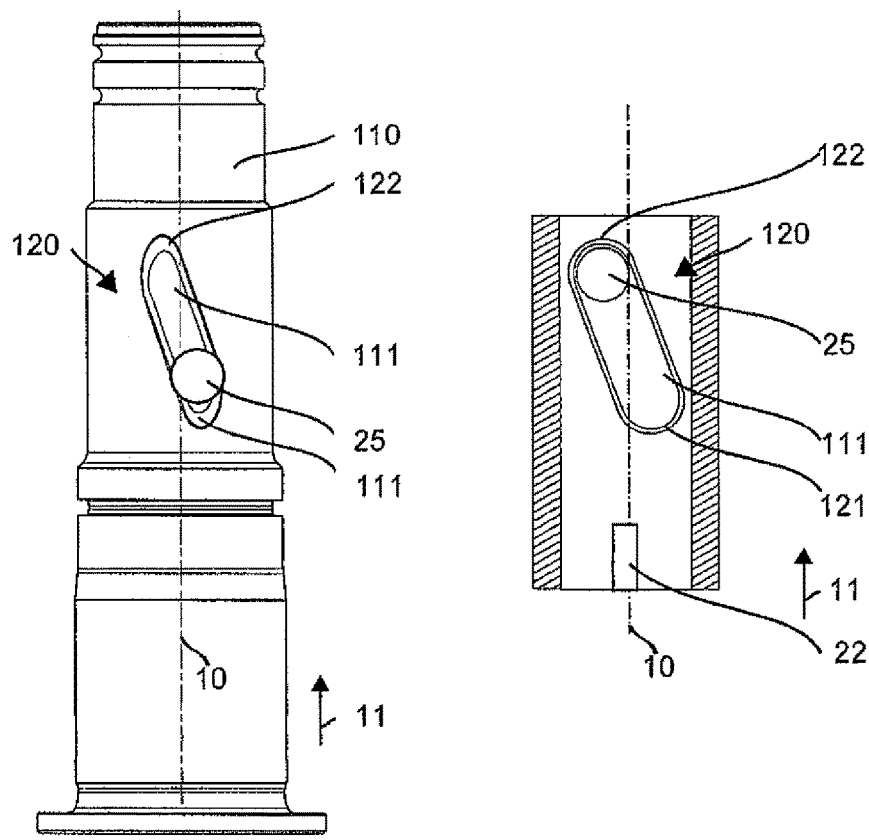
FIGS. 17 and 18: a holding sleeve of a chuck.

FIG. 17 shows a holding sleeve 110 of another embodiment of the chuck 2, while FIG. 18 shows a partial section along the working axis 10. The holding sleeve 110 has one or more slots 111 into which the locking elements 25 are inserted. The locking elements 25 protrude into the prismatic or cylindrical cavity 21 of the holding sleeve 110 in order to lock an inserted tool 4 by means of a locking groove. The locking element 25 has a smaller dimension along the working axis 10 than the slot 111, as a result of which it can move in the slot 111 along the working axis 10. The slot 111 constitutes a sliding block 120 for the locking element 25.

At least one section of the slot 111 is wound helically around the working axis 10. A rear end 121 of the slot 111, as seen in the direction of impact 11, is arranged so as to be rotated around the working axis 10 with respect to a front end 122 as seen in the direction of impact 11. Preferably, the slot 111 is rotated counterclockwise as seen in the direction of impact 11. As soon as the tool 4 moves in the wound section of the sliding block 120 in response to a movement in the direction of impact 11, the tool 4 is forced to rotate around the working axis 10. The rotational movement prevents the tool 4 from pushing the locking element 25 opposite to the direction of impact 11 through the wound sliding block 120. This makes it more difficult for the tool 4 to recoil after an empty strike.

The chuck 2 has short webs 22 or no webs at all for a rotating and carrying operation in order to allow the tool 4 to rotate around the working axis 10. Preferably, an extension of the webs 22 along the working axis 10 is dimensioned in such a way that the shank end 3 is not engaged with the webs 22 when the tool 4 starts to carry the locking element 25 along the working axis 10. The web 22 can be arranged, for instance, so as to be offset with respect to the slots 123 along the working axis 10.

The above-mentioned embodiments can also be combined. The chuck 2 can have the slot 111 with a helical sliding block 120 as well as a helical sliding block 40 on the inside 31 of the locking sleeve 80.

What is claimed is:

1. A chuck for a chiseling power tool comprising:
   a holding sleeve arranged concentrically with respect to a working axis serving to receive one shank end of a tool having a locking groove;
   a locking element protruding partially into the holding sleeve so as to engage with the locking groove, the locking element movable along the working axis; and
   a sliding block, the sliding block having a groove wound helically around the working axis, the locking element being guided in the groove.

2. The chuck as recited in claim 1 further comprising a locking sleeve, an inside of the locking sleeve radially facing the working axis having the sliding block, the sliding block touching the locking element.

3. The chuck as recited in claim 2 wherein the locking sleeve is mounted so as to rotate around the working axis.

4. The chuck as recited in claim 2 wherein the inside of the locking sleeve has a cutout into which another locking element protrudes, a cutout dimension of the cutout being greater in a circumferential direction than a dimension of the sliding block in the circumferential direction.

5. The chuck as recited in claim 4 wherein the cutout has flanks parallel to the working axis, and the sliding block has flanks skewed with respect to the working axis or wound around the working axis.

6. The chuck as recited in claim 2 further comprising a detachable sliding block lock, the sliding block lock, in a locking position, tensioning the sliding block with a spring acting in the impact direction and, in an unlocked position, disengaging the spring from the sliding block.

7. The chuck as recited in claim 6 wherein the sliding block lock has the spring and a coupling element, the coupling element tensioned by a force of the spring against the locking sleeve in a direction of impact, and further comprising an actuation sleeve movable relative to the locking sleeve opposite to the direction of impact and joined to the coupling element or resting on the coupling element opposite to the direction of impact.

8. The chuck as recited in claim 2 wherein the holding sleeve has a slot, the locking element being inserted into the slot, the slot being wound helically around the working axis, at least in some sections.

9. The chuck as recited in claim 1 wherein the section is a helical section having a gradient angle between 5° and 25° relative to the working axis.

10. The chuck as recited in claim 1 wherein the locking element is in contact with the sliding block in a first circumferential direction as well as opposite to the first circumferential direction.

11. A chuck for a chiseling power tool comprising:
a holding sleeve arranged concentrically with respect to a working axis serving to receive one shank end of a tool having a locking groove;
a locking element protruding partially into the holding sleeve so as to engage with the locking groove, the locking element movable along the working axis;
a sliding block, the sliding block having a groove wound helically around the working axis or skewed with respect to the working axis, the locking element being guided in the groove; and
a locking sleeve, an inside of the locking sleeve radially facing the working axis having the sliding block, the sliding block touching the locking element, wherein the inside of the locking sleeve has a cutout into which another locking element protrudes, a cutout dimension of the cutout being greater in a circumferential direction than a dimension of the sliding block in the circumferential direction.

12. The chuck as recited in claim 11 wherein the cutout has flanks parallel to the working axis, and the sliding block has flanks skewed with respect to the working axis or wound around the working axis.

13. A chuck for a chiseling power tool comprising:
a holding sleeve arranged concentrically with respect to a working axis serving to receive one shank end of a tool having a locking groove;
a locking element protruding partially into the holding sleeve so as to engage with the locking groove, the locking element movable along the working axis;
a sliding block, the sliding block having a groove wound helically around the working axis or skewed with respect to the working axis, the locking element being guided in the groove;
a locking sleeve, an inside of the locking sleeve radially facing the working axis having the sliding block, the sliding block touching the locking element; and
a detachable sliding block lock, the sliding block lock, in a locking position, tensioning the sliding block with a spring acting in the impact direction and, in an unlocked position, disengaging the spring from the sliding block.

14. The chuck as recited in claim 13 wherein the sliding block lock has the spring and a coupling element, the coupling element tensioned by a force of the spring against the locking sleeve in a direction of impact, and further comprising an actuation sleeve movable relative to the locking sleeve opposite to the direction of impact and joined to the coupling element or resting on the coupling element opposite to the direction of impact.

* * * * *